April 13, 1948. R. G. FEAR 2,439,422
SHEARING TOOL
Filed Oct. 25, 1943
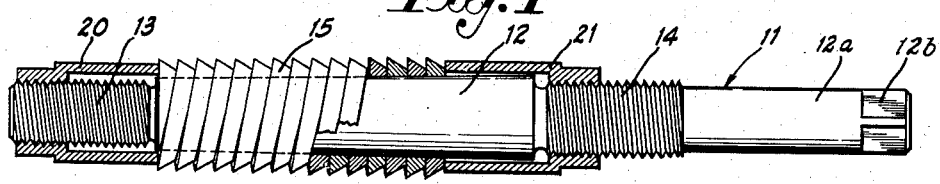
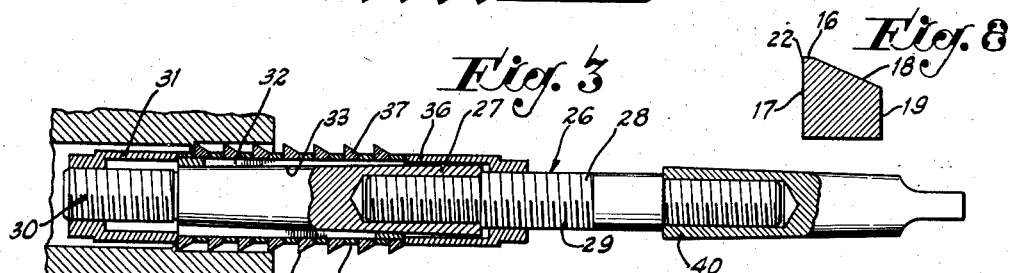
INVENTOR
RALPH GORDON FEAR
BY
HARRIS, KIECH, FOSTER & HARRIS
FOR THE FIRM
ATTORNEYS Patented Apr. 13, 1948

2,439,422

UNITED STATES PATENT OFFICE 2,439,422

SHEARING TOOL

Ralph Gordon Fear, Reseda, Calif.

Application October 25, 1943, Serial No. 507,533

9 Claims. (Cl. 29—95.1)

My invention relates to a shearing tool, and, since it was first incorporated in reamers, broaches, and milling cutters, such embodiments of my invention are hereinafter described in detail, and the objects and advantages of my invention incorporated in such embodiments are herein set forth so that those skilled in the art may readily incorporate my invention in other embodiments.

Among the objects of my invention are the provision of a shearing tool in which the cutting edges are so formed as to remove material from an article by a true shearing action as contrasted with the pressural scraping or wiping of the metal from the work as performed by conventional milling cutters, reamers, and broaches; the provision of a tool which will form a perfectly round, smooth, and true surface without gouging, biting or tearing the surface of the work; the provision of a tool in which the cutting edge may be simply and inexpensively formed from a strip of metal such as tool steel of conventional or regular cross-sectional outline such as a square outline; the provision of such a tool which may be sharpened in a lathe by rotating the tool and maintaining an abrasive stone against the cutting surface; the provision of such a tool having a cutting edge substantially greater than that possessed by conventional tools of this type whereby the life of the tool is materially increased; the provision of such a shearing tool having means for removing the metal cut from the work whereby compressive deformation of the metal and galling due to the passage of the cut metal particles between the cutting edges and the surface of the work is avoided; the provision of a tool in which the cutting edge may be expanded in order to compensate for wear while retaining an effective pilot portion for guiding the tool in the work; the provision of a tool such as described having lands and cutting edges diametrically opposed so that the diameter of the tool can be readily determined by the workman with the use of a micrometer; the provision of a shearing tool in which means is provided for indicating to the workman the exact degree of expansion of the tool secured for each increment of its adjustment so that the workman after determining the diameter of the tool with a micrometer is enabled to quickly and accurately adjust the tool to the desired diameter; and the provision of a shearing tool of the character described in which the quantity of tool steel required is very materially reduced as compared with the tool steel required for cutting tools of conventional construction.

Embodiments of my invention capable of performing the foregoing objects and providing such advantages are described in the following specification, which may be better understood by reference to the accompanying drawing.

In the drawing, which is for illustrative purposes only,

Fig. 1 is a side elevational view partially sectioned illustrating my invention embodied in a reamer;

Fig. 2 is a side elevational view partially sectioned of another embodiment of my invention;

Fig. 3 is a sectional view illustrating another form of my invention as it performs its cutting operation;

Fig. 4 is a side elevational view of the sleeve employed in the construction illustrated in Fig. 3;

Fig. 5 is a transverse sectional view taken as indicated by the line 5—5 of Fig. 4;

Fig. 6 is a side elevational view partially sectioned of my invention embodied in a milling cutter;

Fig. 7 is a fragmentary side elevational view of my invention embodied in a broach;

Fig. 8 is a transverse sectional view of one form of cutting member employed in accordance with my invention;

Fig. 9 is a transverse sectional view of another form of such cutting member; and Fig. 10 is a transverse sectional view of a reamer of conventional construction during its cutting operation.

Referring to the drawing which is for illustrative purposes only, the numeral 11 of Fig. 1 indicates a tool body. The tool body 11 includes an arbor 12 a threaded portion 13 at its outer end, an intermediate threaded portion 14 adjacent the inner end of the arbor 12, and a shank 12a adapted for reception in a chuck of a conventional actuating device for rotating the reamer. The arbor 12 is provided with a forwardly tapering portion which may extend over only the forward part of the arbor 12 with the remainder of the arbor cylindrical in form or which may extend throughout the entire length of the arbor, as illustrated in Fig. 1.

Wound around the arbor 12 is a cutting member 15. Any desired number of the cutting members may be employed and spirally wound around the arbor 12 to provide any desired multiple threads. As illustrated in Fig. 1, two cutting members 15 are employed providing upon the arbor 12 a double thread. As illustrated in Fig. 8 each of the cutting members 15 may with advantage be formed from a strip of metal, such as high-speed steel, which is regular in cross-sectional outline. Thus, if the cutting member is to have the cross-sectional shape illustrated in Fig. 8 it can be formed from a strip of high-speed steel which is substantially square in cross-sectional form, a land 16 being formed at an angle of about 95° with that side of the strip which is to act as a front tooth face 17. The numeral 18 indicates a back tooth face making an angle of the desired value, for example, of the order of 113° with that side 19 of the strip opposite the side constituting the front tooth face 17. The ends of the cutting members 15, being formed so that they are in a plane normal to the axis of the tool body 11 when they are positioned upon the arbor 12, the two cutting members are then wound upon the arbor 12 in alternating relationship.

The numerals 20 and 21 indicate forward and rearward retaining members or sleeves, respectively, which are threaded upon the outer and intermediate threaded portions 13 and 14 of the tool body 11, against the forward and rearward ends of the cutting members 15, respectively. The cutting members 15 are thus secured upon the arbor 12 against longitudinal movement relative to the tool body 11.

The cutting edge 22 of each of the cutting members 15 may be sharpened either only at the forward portion of each of the cutting members or throughout the entire length of the cutting members. If only the cutting edge 22 over the forward portion of each of the cutting members 15 is sharpened, the intersection of the land 16 and front tooth face 17 of the remainder of each of the cutting members performs the dual function of a pilot for guiding the tool in the work and burnishing the surface of the work which has been cut by the sharpened cutting edges 22.

When it is desired to expand the effective diameter of the cutting members 15 for any reason as, for example, because the cutting edges 22 thereof have become worn, it is necessary only to advance the forward and rearward sleeves 20 and 21, respectively, upon the threaded portions 13 and 14 toward the shank 12a, whereupon the cutting members 15 are advanced upon the tapered arbor 12 and the effective diameter of the cutting edges 22 thereof is thereby increased. If desired, the forward portion of the arbor 12 may be provided with a taper of greater degree than the remainder of the arbor, and, when desired, this forward portion of the arbor with the greater taper may be made of such dimensions that the cutting edges 22 of the cutting members 15 disposed thereon perform no cutting operation until they are advanced upon that portion of the arbor 12 rearwardly thereof and of lesser taper.

The pitch of the threads upon the threaded portions 13 and 14 and within the sleeves 20 and 21 may be so related to the degree of taper of the tapered portion of the arbor 12 that each complete revolution of the sleeves 20 and 21 relative to the tool body 11 causes an expansion of the effective diameter of the cutting edges 22 of the cutting members 15 of the desired value.

It will be noted that the cutting edges and the lands 16 of the cutting members are diametrically disposed of the tool body 11 when the cutting members are assembled thereon. The workman is thus enabled to accurately determine the diameter of the cutting edges by use of a micrometer and to quickly and accurately increase this effective diameter to the desired value by rotating the sleeves 20 and 21 that number of turns representative of the increment of diameter increase desired. To facilitate the rotation of the sleeves 20 and 21, they may be provided with oppositely disposed flat surfaces. The shank 12a may likewise be provided with flat surfaces 12b to facilitate the retention of the shank 12a in a chuck of conventional construction.

In the embodiment illustrated in Fig. 2, the parts corresponding to those illustrated in Fig. 1 and hereinbefore described are given similar numbers. This construction is similar to that illustrated in Fig. 1 except that only one of the cutting members 15 is employed, this cutting member being wound upon the arbor in the form of a single thread. The numeral 23 indicates a spacing member which is wound upon the arbor 12 with the cutting member 15 so that they are in alternating relationship. The spacing member 23 may be formed of a strip of metal rectangular in cross section and need not be formed of tool steel.

In this form of my invention there is provided upon the rearward sleeve 21 an indicator 24 which extends rearwardly of the sleeve 21 into proximity with a scale 25 formed upon the shank 12a adjacent the intermediate threaded portion 14 of the tool body 11. The scale 25 indicates the desired units, for example, .001 or .0001 of an inch; the increments in variation of the effective diameter of the cutting edge 22 corresponding to increments of rotation of the rearward sleeve 21 and indicator 24 relative to the tool body 11. The width of the spacing member 23 is made of such dimension relative to the width of the cutting member 15 that the cutting member 15 is positioned around the arbor 12 in the form of a single thread.

In the embodiment of my invention illustrated in Fig. 3, the numerical 26 indicates a tool body including an arbor 27 and a shank 28, the shank 28 being threaded into the end of the arbor 27 and provided with a threaded portion 29 adjacent the arbor 27. The arbor 27 is tapered forwardly and provided at its forward end with a threaded portion 30 for the reception of a forward retaining member or sleeve 31. The numeral 32 indicates an arbor sleeve having a rearwardly flared bore 33, this bore being flared with substantially the same degree as the degree of taper of the arbor 27. The sleeve 32 may have an outer surface which is either cylindrical in form or tapered forwardly of the tool body 26, the form illustrated in Fig. 4 having a cylindrical outer surface. As best illustrated in Figs. 4 and 5, the sleeve 32 is provided with a plurality of slots extending from each end of the sleeve to a radial cylindrical opening 34. In the embodiment illustrated in the drawing, the sleeve 32 is provided with four slots indicated by the numeral 35 extending inwardly of the sleeve from each end thereof.

The sleeve 32 is positioned upon the tapered arbor 27 against a rearward retaining member or sleeve 36 which is threaded upon the threaded portion 29 of the shank 28 and the sleeve is retained in this position by the forward retaining member or sleeve 31 which is threaded upon the end threaded portion 30 of the arbor 27 against the forward end of the sleeve 32. A cutting member 37 and a spacing member 38 similar to the cutting member 15 and spacing member 23 previously described are positioned upon the sleeve 32 so that the cutting edge 39 of the cutting member 37 is in the form of a single thread. The cutting member 37 and the spacing member 38 may be wound in this manner upon the arbor sleeve 32 before the sleeve is installed upon the arbor 27, this form of my invention offering the advantage of permitting the assembly of arbor sleeve, cutting member, and spacing member to be sold and installed as a unit. Threaded upon the rearward end of the shank 28 is a connecting member 40 formed for reception in a conventional chuck of the usual tool actuating device.

When it is desired to increase the effective diameter of the construction of Fig. 3, either because of wear of the cutting edge 39 or for any other reason, it is necessary only for the workman to rotate the rearward sleeve 36 in a manner to move it rearwardly upon the threaded portion 29 of the shank 28 and thereafter to advance the forward sleeve 31 upon the end threaded portion 30 of the arbor 27. This causes the arbor sleeve 32 to be moved rearwardly upon the arbor 27, thus expanding the sleeve 32 and increasing the effective diameter of the cutting edge 39 of the cutting member 37. It will be apparent that the amount of high-speed steel required for the manufacture of the tool illustrated in Fig. 3 is substantially less than that required for the manufacture of tools of such character heretofore employed, since only the cutting member 37 need be made from such steel.

Illustrated in Fig. 6 is an embodiment of my invention adapted for use as a milling cutter and for installation upon and rotation by a drive shaft 41. An arbor 42 having a cylindrical bore 43 is mounted upon the shaft 41 and prevented from rotating relative thereto by a key 43 received in a way 44 in the arbor 42 and a way 45 formed in the shaft 41. The arbor 42 is restrained against movement longitudinally of the shaft 41 by sleeves 47 and 48 secured in any suitable manner to the shaft and abutting the ends of the arbor 42.

The arbor 42 includes a threaded portion 49 adjacent each end thereof and an intermediate tapered portion 50 upon which there is positioned an arbor sleeve 51. The arbor sleeve 51 is provided with a rearwardly flared bore, the flared bore corresponding to the degree of taper of the tapered portion 50 of the arbor 42 as in the embodiment illustrated in Fig. 3 and previously described. The arbor sleeve 51 is provided with a plurality of slots 52, some of which extend inwardly of the arbor sleeve from each end thereof and each of which terminates in a radial cylindrical opening 53 formed in the arbor sleeve 51. The outer surface of the arbor sleeve 51 is preferably cylindrical in form and a plurality of cutting members or a single cutting member is spirally wound thereon. In the form illustrated in Fig. 6, four of cutting members 54 are employed presenting a quadruple thread around the arbor sleeve 51. The arbor sleeve 51, together with the cutting members 54 thereon, is held in the desired position upon the tapered portion 50 of the arbor 42 by lock nuts 55 and 56 threaded upon the threaded portions 49 of the arbor 42 against the ends of the arbor sleeve 51. Each of the lock nuts 55 and 56 is provided with suitable openings 57 for the reception of a tool adapted for rotating them upon the arbor 42.

The cutting member 54 in this embodiment of my invention may be formed from high-speed steel in a strip substantially square in cross section as in the embodiment previously described or may, if desired, be formed in somewhat different shape, as illustrated in Fig. 9. Thus, the cutting member 54 may include a land 58 and upper tooth back 59 similar to the land 16 and tooth back 18 of the form illustrated in Fig. 8. The cutting member 54 may be provided with a tooth face 60 formed with an angle of rake and an engaging tooth back 61 parallel thereto. The numeral 62 indicates an arcuate lower tooth back cooperating with the face 60 of an adjacent cutting member 54 to provide a flute.

In this embodiment of my invention as in those previously described, the effective diameter of the cutting edge 63 at the intersection of the land 58 and the tooth face 60 may be increased to compensate for wear or for any other reason by rotating the locking nuts 55 and 56 in such a manner as to advance the arbor sleeve 51 upon the tapered portion 50 of the arbor 42.

My invention may be embodied not only in rotary reamers and milling cutters, but also in reamers of the pull or push broach type. As illustrated in Fig. 7, my invention when embodied in a broach contemplates the spreading of a connecting member 64 into a sleeve 65 similar in construction to and secured to the arbor in a manner like that described with regard to the sleeve 20 in the embodiment illustrated in Fig. 1. The connecting member is formed of suitable shape for reception in an actuating device adapted to pull or push the tool, such for example as a cylindrical shank having an arcuate seat 66 therein.

In all of the embodiments of my invention previously described, the flutes between adjacent cutting edges are made of sufficient depth to receive the material cut from the work and are so formed as to feed the cut metal forwardly of the hole in the work by the rotation of the tool so that the cut metal is effectively removed from proximity to the cut surface, thus eliminating all danger of its passage between the lands or the cutting edges and the surface of the work and thus preventing the galling or scratching of the cut surface. Likewise, in all of the embodiments of my invention described, only the forward portion of the cutting edges need be initially sharpened, thus prolonging the life of the tool by permitting additional portions spaced rearwardly of the tool bodies to be successively ground as the previously sharpened portions become worn. Likewise, the unsharpened cutting edges may be made of a diameter slightly greater than the sharpened cutting edges at the forward portion of the tool so that in one operation of the tool the work may be cut to exactly the desired form and dimension and then burnished.

In accordance with my invention the cutting edges of the cutting members are so formed as to make an acute angle with the intersecting plane which is normal to the axis of the tool body. By forming the tool so that this angle is small the cutting edges and the tool body are subjected during the cutting operation to compression stresses which are substantially circumferential of the tool body instead of axially thereof, and the cutting edges are caused to exert upon the work with which they are in contact a true shearing or peeling action removing a layer of material, such as metal, from the work with a minimum energy and leaving the cut surface smooth. Such a shearing or peeling action is radically different from the action of a conventional reamer having its cutting edges at an angle of approximately 90°, this action constituting a pressural scraping or wiping action removing a layer of material from the work by compressing it and tearing it from the work, leaving the cut surface rough. This action is illustrated in Fig. 10 in which the numeral 68 indicates a reamer of the shell type mounted upon a mandrel 69 and provided with cutting edges 70 which are substantially parallel with the axis of the mandrel 69. During the rotation of such a conventional tool, each of the cutting edges 70 removes a layer 71 of metal from the work 72 by purely compressive force pushing or shoving upon the layer to accomplish its separation from the work by a tearing or scraping action. Such an action inevitably leaves the cut surface 73 of the work pitted, roughened, and scuffed. In addition, in such a process of metal removal dependent entirely upon the subjection of the work to compressive stress, there is a tendency for the work adjacent the point of contact with the cutting edges of the tool to become deformed or increased in density responsive to such compression, which tendency is so marked in the case of materials having the resilient properties of bronze, or the like, that the compressed portions of the work expand inwardly when the compression thereon is relieved by passage of the cutting edge thereover, thus providing a hole which is not true or of uniform dimension. The shearing or peeling action resulting from the disposition of the cutting edges of the tool at a very small angle, and preferably an angle less than about 20° with the intersecting plane normal to the axis of the tool body, removes the layer of the material from the work without any pressural deformation of the work even though the work be formed of a comparatively resilient metal, such as bronze, so that an absolutely true hole is formed and an absolutely smooth cut surface is provided.

From the foregoing it will be understood that my invention may be embodied in hand reamers, fluting chucking reamers, rose chucking reamers, shell reamers, taper reamers, and various other types of reamers, push or pull broaches, milling cutters, and various other cutting tools.

While those embodiments of my invention hereinbefore described perform the objects and provide the advantages primarily stated, various modifications of such embodiments and other embodiments including my inventive concept will occur to those skilled in the art from the foregoing description, and I therefore wish my invention not to be restricted to the specific forms illustrated and described, but to be understood as including all those modifications and other embodiments coming within the scope of the claims which follow.

I claim as my invention:

1. In a tool for cutting material from an article, which tool is adapted for reception in an actuating device, the combination of: a tool body having an arbor, a portion of which is tapered, and having a shank for reception in such actuating device; a helical cutting member in the form of a thread removably secured around said arbor, said member having a cutting edge formed at an angle of less than about 20 degrees with the plane normal to the axis of said tool body, whereby said cutting edge removes material from such article by shear; and a spacing member removably wound around said arbor between adjacent turns of said cutting member.

2. In a tool for cutting material from an article, which tool is adapted for reception in an actuating device, the combination of: a tool body having an arbor, a portion of which is tapered, and having a shank for reception in such actuating device; a helical cutting member removably secured around said arbor, said member having a cutting edge formed at such acute angle with the plane normal to the axis of said tool body that said cutting edge removes material from such article by shear; sleeve members threaded upon said tool body against the ends of said cutting member whereby the effective diameter of said cutting edge may be varied by varying the position of said cutting member upon said tapered portion; a spacing member removably wound around said arbor between adjacent turns of said cutting member; and indicia means actuated by relative motion of one of said sleeve members and said tool body and adapted for indicating variations in the effective diameter of said cutting edge for variations in the position of said one of said sleeve members and said cutting member upon said tapered portion.

3. In a cutting tool of the character described, the combination of: a tool body having an arbor; a helical cutter having a cutting edge thereon and having a plurality of spaced convolutions which are wound around said arbor; and a helical spacer having a plurality of convolutions which are wound around said arbor and each of which is interposed between adjacent of said convolutions of said helical cutter.

4. In a cutting tool of the character described, the combination of: a tool body having a tapered arbor; a helical cutter having a cutting edge thereon and having a plurality of spaced convolutions which are wound around said arbor; a helical spacer having a plurality of convolutions which are wound around said arbor and each of which is interposed between adjacent of said convolutions of said helical cutter, said helical cutter and said helical spacer being movable longitudinally of said tapered arbor to vary the diameter of said cutting edge; and adjusting means on said tool body for retaining said helical cutter and said helical spacer on said arbor and for moving them longitudinally of said arbor to vary the diameter of said cutting edge.

5. In a cutting tool of the character described, the combination of: a tool body having a tapered arbor; a helical cutter having a cutting edge thereon and having a plurality of spaced convolutions which are wound around said arbor; a helical spacer having a plurality of convolutions which are wound around said arbor and each of which is interposed between adjacent of said convolutions of said helical cutter, said helical cutter and said helical spacer being movable longitudinally of said tapered arbor to vary the diameter of said cutting edge; adjusting means on said tool body for retaining said helical cutter and said helical spacer on said arbor and for moving them longitudinally of said arbor to vary the diameter of said cutting edge; and means on said tool body and said adjusting means for indicating variations in the diameter of said cutting edge.

6. In a cutting tool of the character described, the combination of: a tool body having a tapered arbor; an expansible sleeve on said arbor, said sleeve being movable longitudinally of said arbor to expand or contract said sleeve so as to vary the diameter thereof; a continuous helical cutter wound around said sleeve, said cutter having a cutting edge thereon; and adjusting means on said tool body for retaining said sleeve on said arbor and for moving it longitudinally of said arbor to vary the diameter thereof so as to vary the diameter of said cutting edge.

7. In a cutting tool of the character described, the combination of: a tool body having a tapered arbor; an expansible sleeve on said arbor, said sleeve being movable longitudinally of said arbor to expand or contract said sleeve so as to vary the diameter thereof; a continuous helical cutter wound around said sleeve, said cutter having a cutting edge thereon; adjusting means on said tool body for retaining said sleeve on said arbor and for moving it longitudinally of said arbor to vary the diameter thereof so as to vary the diameter of said cutting edge; and means on said tool body and said adjusting means for indicating the diameter of said cutting edge.

8. In a cutting tool of the character described, the combination of: a tool body having a tapered arbor; an expansible sleeve on said arbor, said said sleeve being movable longitudinally of said arbor to expand or contract said sleeve so as to vary the diameter thereof; a helical cutter having a cutting edge thereon and having a plurality of spaced convolutions which are wound around said sleeve; a helical spacer having a plurality of convolutions which are wound around said sleeve and each of which is interposed between adjacent of said convolutions of said helical cutter; and adjusting means on said tool body for retaining said sleeve on said arbor and for moving it longitudinally thereof to vary the diameter of said sleeve so as to vary the diameter of said cutting edge.

9. In a cutting tool of the character described, the combination of: a tool body having a tapered arbor; an expansible sleeve on said arbor, said sleeve being movable longitudinally of said arbor to expand or contract said sleeve so as to vary the diameter thereof; a helical cutter having a cutting edge thereon and having a plurality of spaced convolutions which are wound around said sleeve; a helical spacer having a plurality of convolutions which are wound around said sleeve and each of which is interposed between adjacent of said convolutions of said helical cutter; adjusting means on said tool body for retaining said sleeve on said arbor and for moving it longitudinally thereof to vary the diameter of said sleeve so as to vary the diameter of said cutting edge; and means on said tool body and said adjusting means for indicating the diameter of said cutting edge.

RALPH GORDON FEAR.

REFERENCES CITED

The following references are of record in the file of this patent:

UNITED STATES PATENTS

| Number | Name | Date |
|---|---|---|
| 751,506 | Hatfield | Feb. 9, 1904 |
| 817,451 | Simmons | Apr. 10, 1906 |
| 848,113 | Matthews | Mar. 26, 1907 |
| 1,266,538 | Alexander | May 14, 1918 |
| 1,321,243 | Pettersen et al. | Nov. 11, 1919 |
| 1,339,657 | LaPointe | May 11, 1920 |
| 1,359,541 | Smith | Nov. 23, 1920 |
| 1,415,578 | Knoop | May 9, 1922 |
| 1,485,652 | Wakefield et al. | Mar. 4, 1924 |
| 1,593,955 | Schmittner | July 27, 1926 |
| 1,692,977 | DeVoe et al. | Nov. 27, 1928 |
| 1,724,699 | LaPointe | Aug. 13, 1929 |
| 1,752,653 | Ridler | Apr. 1, 1930 |

FOREIGN PATENTS

| Number | Country | Date |
|---|---|---|
| 146,049 | Great Britain | June 8, 1920 |
| 480,721 | Germany | Aug. 7, 1929 |
| 547,347 | France | Dec. 7, 1922 |